(12) United States Patent
Bacon et al.

(10) Patent No.: US 10,445,391 B2
(45) Date of Patent: Oct. 15, 2019

(54) YEARBOOK PUBLISHING SYSTEM

(71) Applicant: Jostens, Inc., Minneapolis, MN (US)

(72) Inventors: Betty L. Bacon, Clarksville, TN (US); Murad S. Velani, Edina, MN (US); Randall L. Bice, Cleveland, MN (US); Michael Heeter, Bloomington, MN (US)

(73) Assignee: Jostens, Inc., Minneapolis, MN (US)

( * ) Notice: Subject to any disclaimer, the term of this patent is extended or adjusted under 35 U.S.C. 154(b) by 623 days.

(21) Appl. No.: 14/947,736

(22) Filed: Nov. 20, 2015

(65) Prior Publication Data
US 2016/0283068 A1 Sep. 29, 2016

Related U.S. Application Data

(60) Provisional application No. 62/139,261, filed on Mar. 27, 2015.

(51) Int. Cl.
*G06F 3/0484* (2013.01)
*G06F 16/955* (2019.01)
*G06F 21/12* (2013.01)

(52) U.S. Cl.
CPC .......... *G06F 16/955* (2019.01); *G06F 3/0484* (2013.01); *G06F 21/12* (2013.01); *G06F 2221/0717* (2013.01)

(58) Field of Classification Search
CPC .................................................. G06F 3/0484
See application file for complete search history.

(56) References Cited

U.S. PATENT DOCUMENTS

| 3,892,427 A | 7/1975 | Kraynak et al. |
| 4,877,269 A | 10/1989 | Callaghan et al. |

(Continued)

FOREIGN PATENT DOCUMENTS

| AU | 675344 | 1/1997 |
| CA | 2166963 | 1/2000 |

(Continued)

OTHER PUBLICATIONS

Diallo, "Adobe's Subscription-Only CC Release Carries Obvious Upside But Big Risk," Jun. 17, 2013, https://www.forbes.com/sites/amadoudiallo/2013/06/17/adobe-cc-subscription-release-big-upside-and-risk/.*

(Continued)

*Primary Examiner* — Ryan Barrett
(74) *Attorney, Agent, or Firm* — Brown Rudnick LLP

(57) ABSTRACT

A yearbook publishing system may include a web-based system hosted on a local server accessible by a user via the internet. The web-based system may include a plurality of design tools for designing a yearbook and an alternative design software access feature. The system may include a portal accessible using the design software access feature. The portal may include an authentication feature and a navigation feature for navigating a user to a selected design space based on affiliation with a particular group, such as a particular school, for example. The system may also include a cloud-based system hosted on an on-demand cloud server in communication with the local server and hosting design software. The cloud-based system being accessible via the portal and configured to provide segregated user access to the selected design space for using the design software.

20 Claims, 14 Drawing Sheets

(56) References Cited

U.S. PATENT DOCUMENTS

| | | |
|---|---|---|
| 5,114,291 A | 5/1992 | Hefty |
| 5,181,162 A | 1/1993 | Smith et al. |
| 5,190,316 A | 3/1993 | Hefty |
| 5,220,657 A | 6/1993 | Bly et al. |
| 5,293,475 A | 3/1994 | Hennigan et al. |
| 5,323,312 A | 6/1994 | Saito et al. |
| 5,390,354 A | 2/1995 | de Heus et al. |
| 5,428,777 A | 6/1995 | Perliski et al. |
| 5,434,961 A | 7/1995 | Horiuchi et al. |
| 5,475,805 A | 12/1995 | Murata |
| 5,478,120 A | 12/1995 | D'Andrea |
| 5,513,117 A | 4/1996 | Small |
| 5,517,621 A | 5/1996 | Fukui et al. |
| 5,524,932 A | 6/1996 | Kalisher |
| 5,552,994 A | 9/1996 | Cannon et al. |
| 5,555,362 A | 9/1996 | Yamashita et al. |
| 5,600,563 A | 2/1997 | Cannon et al. |
| 5,652,421 A | 7/1997 | Veeneman et al. |
| 5,715,325 A | 2/1998 | Bang et al. |
| 5,729,674 A | 3/1998 | Rosewarne et al. |
| 5,748,484 A | 5/1998 | Cannon et al. |
| 5,751,590 A | 5/1998 | Cannon et al. |
| 5,787,419 A | 7/1998 | Sato et al. |
| 5,838,836 A | 11/1998 | Omvik |
| 5,850,520 A | 12/1998 | Griebenow et al. |
| 5,953,733 A | 9/1999 | Langford-Wilson |
| 6,005,560 A | 12/1999 | Gill et al. |
| 6,012,071 A | 1/2000 | Krishna et al. |
| 6,088,702 A | 7/2000 | Plantz et al. |
| 6,092,054 A | 7/2000 | Tackbary et al. |
| 6,111,586 A | 8/2000 | Ikeda et al. |
| 6,123,362 A | 9/2000 | Squilla et al. |
| 6,134,568 A | 10/2000 | Tonkin |
| 6,138,106 A | 10/2000 | Walker et al. |
| 6,142,530 A | 11/2000 | Emmerich |
| 6,157,864 A | 12/2000 | Schwenke et al. |
| 6,161,113 A | 12/2000 | Mora et al. |
| 6,301,370 B1 | 10/2001 | Steffens et al. |
| 6,304,272 B1 | 10/2001 | Schanel et al. |
| 6,324,545 B1 | 11/2001 | Morag |
| 6,366,918 B1 | 4/2002 | Guttman et al. |
| 6,370,514 B1 | 4/2002 | Messner |
| 6,505,202 B1 | 1/2003 | Mosquera et al. |
| 6,507,845 B1 | 1/2003 | Cohen et al. |
| 6,542,936 B1 | 4/2003 | Mayle et al. |
| 6,583,799 B1 | 6/2003 | Manolis et al. |
| 6,632,251 B1 | 10/2003 | Rutten et al. |
| 6,681,032 B2 | 1/2004 | Bortolussi et al. |
| 6,683,611 B1 | 1/2004 | Cleveland |
| 6,745,238 B1 | 6/2004 | Giljum et al. |
| 6,826,534 B1 | 11/2004 | Gupta et al. |
| 6,826,727 B1 | 11/2004 | Mohr et al. |
| 6,898,601 B2 | 5/2005 | Amado et al. |
| 7,107,249 B2 | 9/2006 | Dively et al. |
| 7,117,254 B2 | 10/2006 | Lunt et al. |
| 7,148,990 B2 | 12/2006 | Atkins et al. |
| 7,188,310 B2 | 3/2007 | Schwartzkopf |
| 7,209,889 B1 | 4/2007 | Whitfield |
| 7,290,031 B2 | 10/2007 | Yamashita |
| 7,343,320 B1 | 3/2008 | Treyz et al. |
| 7,346,656 B2 | 3/2008 | Worthen |
| 7,401,289 B2 | 7/2008 | Lachhwani et al. |
| 7,474,801 B2 | 1/2009 | Teo et al. |
| 7,509,570 B2 | 3/2009 | Narusawa |
| 7,551,755 B1 | 6/2009 | Steinberg et al. |
| 7,599,527 B2 | 10/2009 | Shah et al. |
| 7,599,938 B1 | 10/2009 | Harrison, Jr. |
| 7,600,183 B2 | 10/2009 | Stern et al. |
| 7,636,450 B1 | 12/2009 | Bourdev |
| 7,643,671 B2 | 1/2010 | Dong et al. |
| 7,684,595 B2 | 3/2010 | Kamgar-Parsi et al. |
| 7,757,166 B2 | 7/2010 | Nelson et al. |
| 7,853,100 B2 | 12/2010 | Sundstrom et al. |
| 7,904,322 B2 | 3/2011 | Gauger |
| 7,984,380 B2 * | 7/2011 | Mindrum .............. G06F 17/211 715/763 |
| 7,991,203 B2 | 8/2011 | Tsai |
| 8,024,658 B1 | 9/2011 | Fagans et al. |
| 8,130,276 B2 | 3/2012 | Holmes |
| 8,131,114 B2 | 3/2012 | Wang et al. |
| 8,218,857 B2 | 7/2012 | Moriyama et al. |
| 8,429,517 B1 | 4/2013 | Damera-Venkata et al. |
| 8,568,448 B2 | 10/2013 | Nowakowski |
| 8,606,594 B2 | 12/2013 | Stern et al. |
| 8,677,234 B2 | 3/2014 | Underwood et al. |
| 8,719,699 B2 | 5/2014 | O'Brien |
| 2002/0032633 A1 | 3/2002 | Okumura |
| 2002/0059340 A1 | 5/2002 | Centrone |
| 2002/0077848 A1 | 6/2002 | Campbell |
| 2002/0087435 A1 | 7/2002 | Neishi et al. |
| 2002/0091739 A1 | 7/2002 | Ferlitsch et al. |
| 2002/0103813 A1 | 8/2002 | Frigon |
| 2002/0120757 A1 | 8/2002 | Sutherland et al. |
| 2002/0167538 A1 | 11/2002 | Bhetanabhotla |
| 2002/0178078 A1 | 11/2002 | O'Toole |
| 2003/0037076 A1 | 2/2003 | Bravery et al. |
| 2003/0056177 A1 | 3/2003 | Nara et al. |
| 2003/0078856 A1 | 4/2003 | Zubi |
| 2003/0140315 A1 | 7/2003 | Blumberg et al. |
| 2003/0220905 A1 | 11/2003 | Amado et al. |
| 2003/0221162 A1 | 11/2003 | Sridhar |
| 2004/0003342 A1 | 1/2004 | Keane et al. |
| 2004/0032607 A1 | 2/2004 | Ohkuma et al. |
| 2004/0107125 A1 | 6/2004 | Guheen et al. |
| 2004/0107855 A1 | 6/2004 | Kizaki et al. |
| 2004/0122696 A1 | 6/2004 | Beringer |
| 2004/0139232 A1 | 7/2004 | Giannetti et al. |
| 2004/0165218 A1 | 8/2004 | Fredlund et al. |
| 2004/0167796 A1 | 8/2004 | Lynch et al. |
| 2004/0194033 A1 | 9/2004 | Holzwarth et al. |
| 2004/0199867 A1 | 10/2004 | Brandenborg |
| 2004/0225960 A1 | 11/2004 | Parikh et al. |
| 2004/0254859 A1 | 12/2004 | Aslanian, Jr. |
| 2004/0264780 A1 | 12/2004 | Zhang et al. |
| 2004/0268299 A1 | 12/2004 | Lei et al. |
| 2005/0055624 A1 | 3/2005 | Seeman et al. |
| 2005/0055635 A1 | 3/2005 | Bargeron et al. |
| 2005/0105803 A1 | 5/2005 | Ray |
| 2005/0125535 A1 | 6/2005 | Gatt |
| 2005/0125726 A1 | 6/2005 | Harper et al. |
| 2005/0154675 A1 | 7/2005 | Johnson, Jr. |
| 2005/0188799 A1 | 9/2005 | Kocienski |
| 2005/0251742 A1 | 11/2005 | Mogilevsky et al. |
| 2005/0276443 A1 | 12/2005 | Slamani et al. |
| 2006/0023923 A1 | 2/2006 | Geng et al. |
| 2006/0031746 A1 | 2/2006 | Toepfer et al. |
| 2006/0109517 A1 | 5/2006 | Catalan |
| 2006/0123330 A1 | 6/2006 | Horiuchi et al. |
| 2006/0129924 A1 | 6/2006 | Nelson et al. |
| 2006/0178918 A1 | 8/2006 | Mikurak |
| 2006/0190808 A1 | 8/2006 | Balthaser |
| 2006/0206836 A1 | 9/2006 | Wessling et al. |
| 2007/0043830 A1 | 2/2007 | Housenbold |
| 2007/0083851 A1 | 4/2007 | Huang et al. |
| 2007/0130509 A1 | 6/2007 | Gombert et al. |
| 2007/0150542 A1 | 6/2007 | Sommerer |
| 2007/0168382 A1 | 7/2007 | Tillberg et al. |
| 2007/0171716 A1 | 7/2007 | Wright et al. |
| 2007/0188597 A1 | 8/2007 | Kenoyer |
| 2008/0007788 A1 | 1/2008 | Good et al. |
| 2008/0013801 A1 | 1/2008 | Reed et al. |
| 2008/0154903 A1 | 6/2008 | Crowley et al. |
| 2008/0154931 A1 | 6/2008 | Jacobs et al. |
| 2008/0189609 A1 | 8/2008 | Larson et al. |
| 2008/0205655 A1 | 8/2008 | Wilkins et al. |
| 2008/0292147 A1 | 11/2008 | Bronstein et al. |
| 2008/0294977 A1 | 11/2008 | Friedman et al. |
| 2009/0141950 A1 | 6/2009 | Ryu |
| 2009/0144615 A1 | 6/2009 | Brown et al. |
| 2009/0158182 A1 | 6/2009 | McCurdy et al. |
| 2009/0158183 A1 | 6/2009 | McCurdy et al. |
| 2009/0185723 A1 | 7/2009 | Kurtz et al. |
| 2009/0216569 A1 | 8/2009 | Bonev et al. |

(56) References Cited

U.S. PATENT DOCUMENTS

| | | | |
|---|---|---|---|
| 2009/0248703 A1 | 10/2009 | Tsukagoshi et al. | |
| 2009/0252383 A1 | 10/2009 | Adam et al. | |
| 2009/0287990 A1 | 11/2009 | Lynton et al. | |
| 2010/0050090 A1 | 2/2010 | Leebow | |
| 2010/0054601 A1 | 3/2010 | Anbalagan et al. | |
| 2010/0070572 A1 | 3/2010 | Olson et al. | |
| 2010/0070573 A1 | 3/2010 | Olson et al. | |
| 2010/0070579 A1 | 3/2010 | Olson et al. | |
| 2010/0114596 A1 | 5/2010 | Williams et al. | |
| 2010/0150407 A1 | 6/2010 | Cheswick | |
| 2010/0172551 A1 | 7/2010 | Gilley et al. | |
| 2010/0211958 A1* | 8/2010 | Madison, Jr. | G06F 11/3433 718/105 |
| 2010/0216441 A1 | 8/2010 | Larsson et al. | |
| 2010/0229085 A1 | 9/2010 | Nelson et al. | |
| 2010/0266155 A1 | 10/2010 | Goell et al. | |
| 2010/0266167 A1 | 10/2010 | Kodesh et al. | |
| 2010/0287053 A1 | 11/2010 | Ganong et al. | |
| 2010/0322507 A1 | 12/2010 | Gunaratne | |
| 2011/0038512 A1 | 2/2011 | Petrou et al. | |
| 2011/0123071 A1 | 5/2011 | Shah et al. | |
| 2011/0135165 A1 | 6/2011 | Wechsler et al. | |
| 2011/0182482 A1 | 7/2011 | Winters et al. | |
| 2011/0188713 A1 | 8/2011 | Chin et al. | |
| 2012/0054072 A1 | 3/2012 | McCurdy et al. | |
| 2012/0054600 A1 | 3/2012 | McCurdy et al. | |
| 2012/0054647 A1 | 3/2012 | McCurdy et al. | |
| 2012/0106806 A1 | 5/2012 | Folta et al. | |
| 2012/0113275 A1 | 5/2012 | Bladel et al. | |
| 2012/0147167 A1 | 6/2012 | Manson et al. | |
| 2012/0328168 A1 | 12/2012 | Dailey et al. | |
| 2012/0328169 A1 | 12/2012 | Heeter et al. | |
| 2012/0331371 A1 | 12/2012 | Larson et al. | |
| 2013/0198659 A1 | 8/2013 | Swider et al. | |
| 2013/0289759 A1 | 10/2013 | Henry | |
| 2013/0332856 A1* | 12/2013 | Sanders | G06F 16/176 715/753 |
| 2014/0046778 A1* | 2/2014 | Olson | G06Q 30/0277 705/14.69 |
| 2014/0096015 A1* | 4/2014 | Grosz | G06F 3/1242 715/738 |
| 2014/0096029 A1* | 4/2014 | Schultz | G06F 3/1242 715/747 |
| 2014/0256420 A1* | 9/2014 | Justice | G06F 12/00 463/29 |
| 2016/0139742 A1* | 5/2016 | Dayama | G06Q 10/101 715/739 |

FOREIGN PATENT DOCUMENTS

| | | |
|---|---|---|
| JP | 2001256210 | 9/2001 |
| JP | 2003177503 | 6/2003 |
| JP | 2004258920 | 9/2004 |
| JP | 2006277741 | 12/2006 |
| KR | 20010032209 | 4/2001 |
| KR | 1020010057329 | 7/2001 |
| KR | 20020012582 | 2/2002 |
| KR | 1020020061394 | 7/2002 |
| KR | 1020040028641 | 4/2004 |
| WO | 2006063327 | 6/2006 |
| WO | 2006127660 | 11/2006 |

OTHER PUBLICATIONS

Konomi Senda, Word 2003, Perfect Master, Windows XP Full Support, Japan, Hideaki Makitani, Dec. 8, 2003, First Edition, First Publication, p. 723-734.

International Search Report for related PCT Application No. PCT/US2012/023259 dated May 15, 2012 (3 pp.).

International Search Report for related PCT Application PCT/US2012/023324 dated May 23, 2012 (3 pp.).

Notice of Final Rejection for related Japanese Patent Application 2009-547306 dated May 22, 2012 (2 pp.).

* cited by examiner

YEARBOOK PUBLISHING SYSTEM

CROSS-REFERENCE TO RELATED APPLICATIONS

The present application claims priority to U.S. Provisional Application No. 62/139,261, entitled Yearbook Publishing System, and filed on Mar. 27, 2015, the contents of which are hereby incorporated by reference in their entirety.

FIELD OF THE INVENTION

The present disclosure relates to systems and methods for yearbook design and publication. Particularly, the present disclosure relates to systems and methods for providing remote access to yearbook design and publishing hardware and software. More particularly, the present disclosure relates to systems and methods for web-based yearbook design in conjunction with cloud-based processing and storage.

BACKGROUND OF THE INVENTION

Sophisticated design software such as Adobe InDesign, Adobe Photoshop, Quark, Corel, and other third party systems are often used for yearbook design. Typically, access to such sophisticated software may require a user to purchase the software, install it locally, and purchase associated licenses. In many cases, users may be students or yearbook staff at a school, such as a high school. Maintaining updated software and licenses may be especially difficult for schools because of the time and cost involved. Schools may also be required to purchase multiple licenses in many cases so that the software may be available on multiple machines. In addition to the software used to design yearbooks, sufficient hardware is typically required as well. Hardware sufficient to support and store the design software and yearbook design files may require additional time and cost, which may be especially difficult for a school to expend. Both hardware and software may also require troubleshooting and maintenance, requiring further time and cost and placing additional demands on a school's existing information technology resources.

As may be appreciated, depending on financial and information technology resources, which vary drastically from school to school, some schools may not have sufficient resources to implement, maintain, and troubleshoot sophisticated design software or may simply elect not to use this approach to avoid the hassles.

Thus there exists a need in the art for a yearbook design and publishing system that avoids at least some of the time and expense of acquiring, maintaining, and supporting software and hardware typically needed for such systems.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a yearbook publishing system having a web-based system and a cloud-based system. The web-based system may be hosted on a local server accessible by a user via the Internet, and may have a plurality of design tools for designing a yearbook and an alternative design software access feature. The cloud-based system may be hosted on an on-demand cloud server in communication with the local server and may host design software. The cloud-based system may further be accessible via the web-based system and may be configured to provide dynamically provisioned and segregated user access to a selected design space based on affiliation with a particular group, wherein from the selected design space, the design software is accessible. In some embodiments, the cloud-based system may include an output feature for outputting a portion of a yearbook design. The web-based system may include a publication component for receiving the portion of the yearbook design output from the output feature. In some embodiments, the publication component may be configured for printing and binding a portion of the yearbook. The web-based system may further have a ladder feature for depicting thumbnail images of yearbook pages to depict completion status in some embodiments. The output feature may be in communication with the ladder feature to maintain an up-to-date completion status in some embodiments. The yearbook publishing system may further include a portal accessible using the alternative design software access feature. The portal may provide access from the web-based system to the cloud-based system, and may have an authentication feature and a navigation feature for navigating a user to a selected design space based on affiliation with a particular group.

The present disclosure, in another embodiment, relates to a method for providing yearbook design software including the steps of providing a web-based system and providing dynamically provisioned and segregated user access. The web-based system may be hosted on a local server and may be accessible by a user via the internet. The web-based system may further include a plurality of design tools for designing a yearbook and an alternative design software access feature. The dynamically provisioned and segregated user access may provide user access to a selected design space based on affiliation with a particular group, wherein from the selected design space, the design software is provided via a cloud-based system hosted on an on-demand cloud server in communication with the local server and hosted design software, the cloud-based system being accessible via the web-based system. The cloud-based system may include an output feature for outputting a portion of a yearbook design. In some embodiments, the web-based system may include a publication component for receiving the portion of the yearbook design output from the output feature. The publication component may be configured for printing and binding the portion of the yearbook. The web-based system may further include a ladder feature for depicting thumbnail images of yearbook pages to depict completion status. The method may further include providing an authentication portal accessible using the alternative design software access feature. The portal may provide access from the web-based system to the cloud-based system and may have an authentication feature and a navigation feature for navigating a user to a selected design space based on affiliation with a particular group. In addition, the cloud-based system may be configured to pre-spawn based on usage.

The present disclosure, according to another embodiment, relates to a method for providing yearbook design software including the steps of providing access to an on-demand cloud server, providing a unique design space on the cloud server for each of a plurality of groups, and providing application streaming of the design software. The cloud server may be configured to host the design software. Further, in some embodiments, access to the on-demand cloud server may be provided based on a group affiliation with one of a plurality of groups. For each of the plurality of groups, a unique design space may be provided on the cloud server. In some embodiments, each design space may include one or more design tools. Each design space may be a pre-configuration of software and design tools, and each pre-configuration may be stored in a configuration database. Each group may be a school, and each pre-configuration may be determined by each school. The method may include providing an output feature for outputting a portion of a yearbook design in some embodiments. In some embodiments, the application streaming may provide limited access to the design software.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in some embodiments, relates to a design and/or publishing system for creation of yearbooks. In particular, the system includes a web-based yearbook design system in conjunction with an option for utilizing sophisticated design software that is hosted on a cloud-based processing and storage system. More particularly, for example, a user may begin by accessing the web-based yearbook design system and an option for utilizing the design software may be provided. For example, a feature may be included for leaving the web-based yearbook design system to access a portal to the design software. The portal may include features for authenticating and/or logging users into the design software and verifying software licenses. In addition, the portal may include features for selecting and verifying a user's affiliation with a particular user group such as a school. The system may navigate that user to a particular segregated space or cell assigned to that user group or school for utilizing the design software. As may be appreciated, having passed through the portal, a user may access the cloud-based processing and storage system which may make the design software available while also maintaining each school in a segregated design space or cell. The cloud-based system may allow a wide range and/or number of users to access the design space, leverage the design software, and collaborate on a yearbook design for a particular school. At the same time, multiple users from varying schools may access the design software simultaneously while being segregated from other school yearbook designs and being limited to viewing and working on their own yearbook design.

Figure 1A:
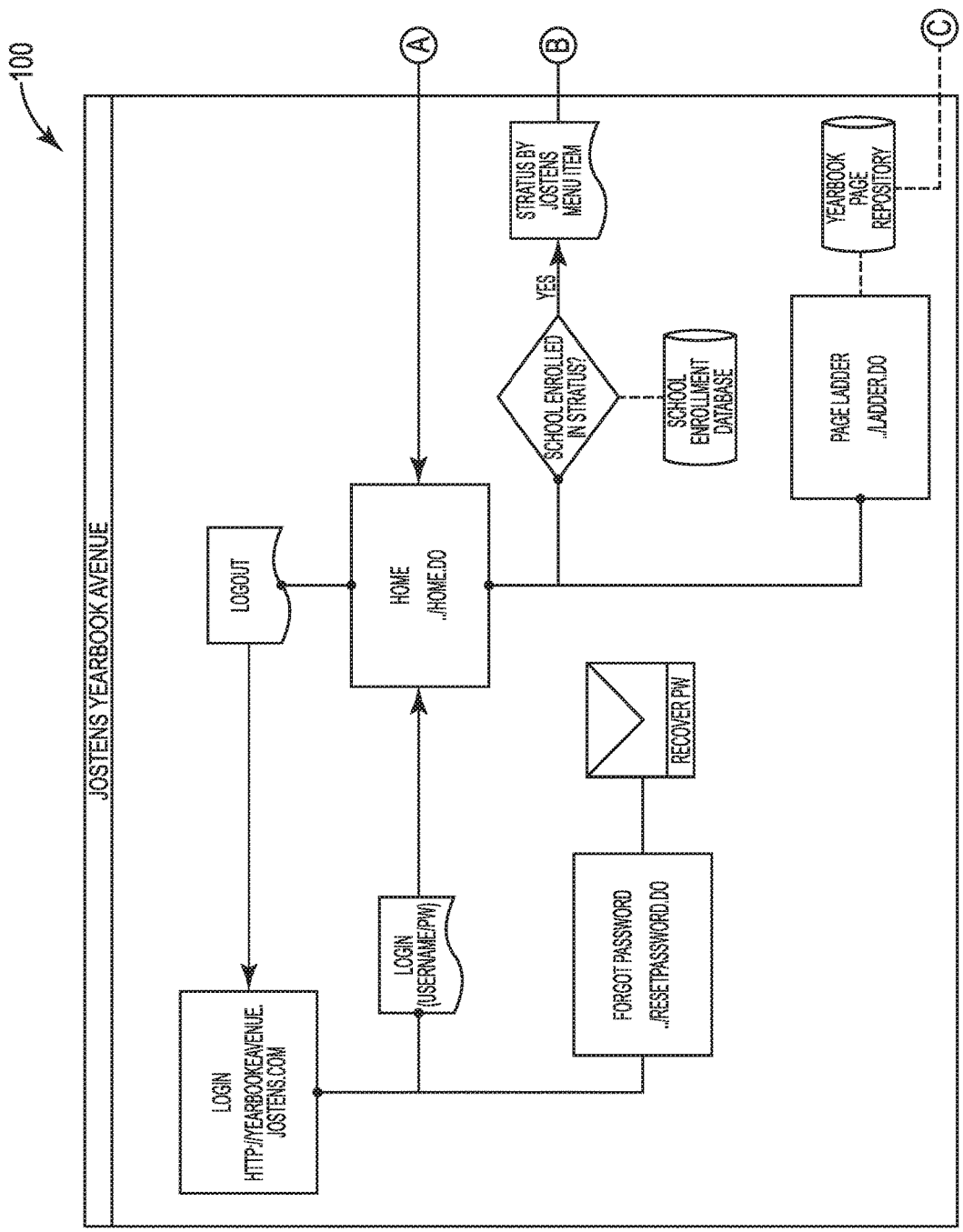
FIG. 1 is a flow diagram showing a yearbook publishing system, according to one or more embodiments.
Figure 1B:
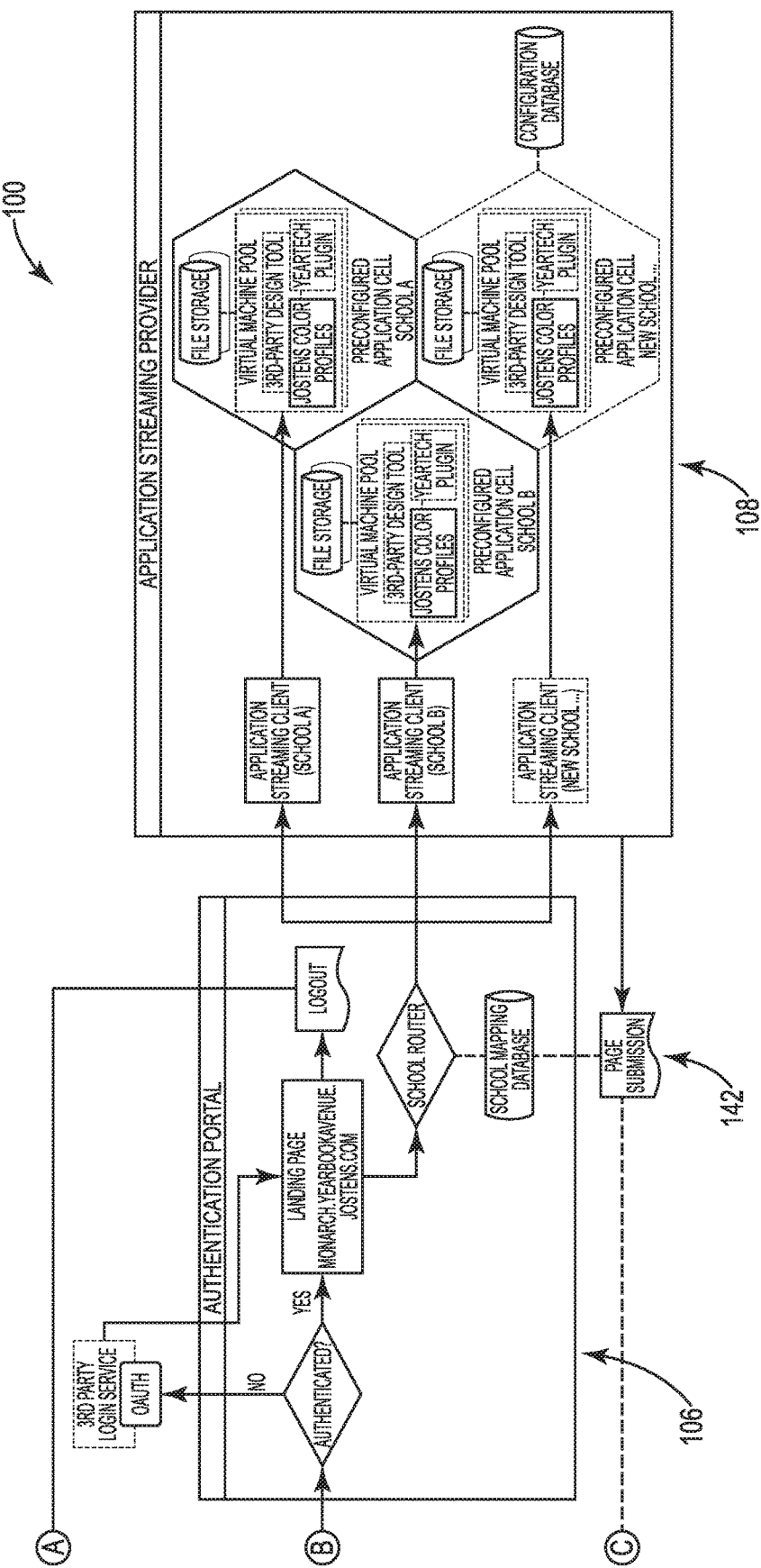

Turning now to FIG. 1, a flow diagram of a yearbook design and/or publishing system 100 is shown. As shown, the system 100 may include a web-based yearbook design system 104, a design software access portal 106, and a hosted design system 108. The system 100 as a whole may allow a user to select between one of two design tools: the web-based yearbook design system 104, and the hosted design system 108. In either case, the design tools may provide for designing and creating a yearbook by multiple schools, while maintaining the designs in isolation from one school to the next. Each of the design tools 104, 108 may also be configured for submitting the finished yearbook to a centralized production system for printing the yearbook. As such, schools may have the option of using a web-based system 104 for yearbook design or leveraging a software system 108 for that design. In the case of the latter, the software may be more akin to a system a student may use in a future journalism or publishing career and, as such, may allow for career preparation in additional ways.

Figure 2:
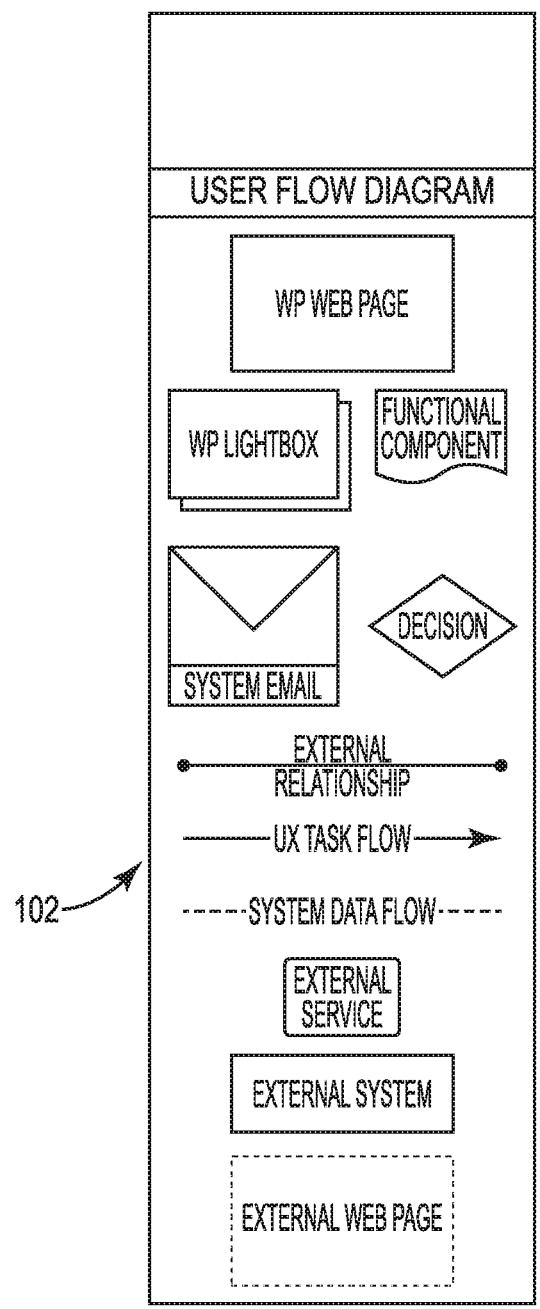
FIG. 2 shows a close-up view of a legend of flow diagram elements of the diagram of FIG. 1.

FIG. 2 shows a close-up view of a legend 102 of the flow diagram elements of the diagram of FIG. 1. While the legend 102 provides examples of particular elements, this is simply for purposes of explanation and not particular element should be limited by the type of symbol used to describe it.

Figure 3:
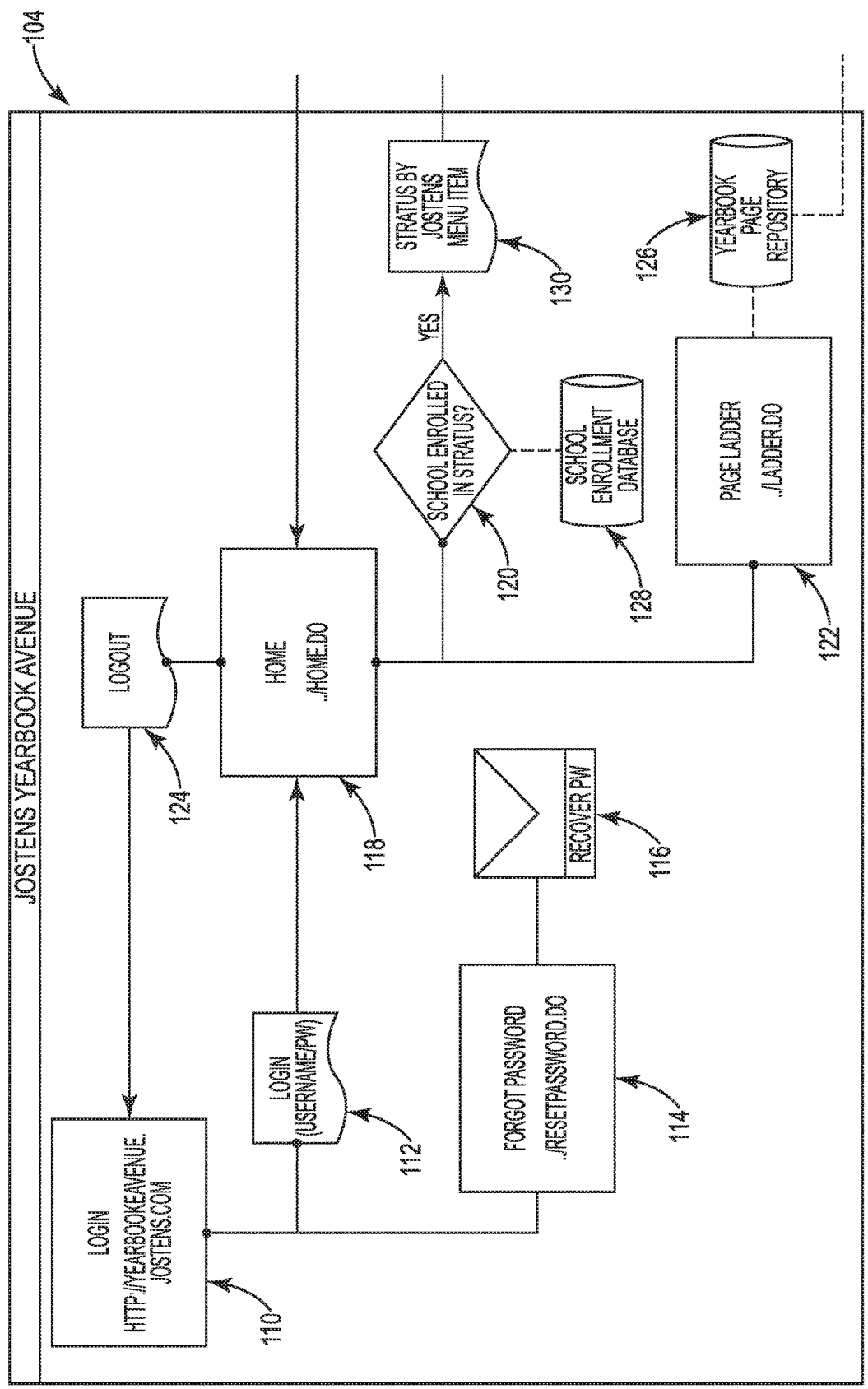
FIG. 3 shows a close-up view of a yearbook design system, according to some embodiments.

FIG. 3 shows a close-up view of the web-based yearbook design system 104. The web-based yearbook design system 104 may be hosted on local server owned and operated by a yearbook publishing company, such as Jostens, for example. In other embodiments the web-based system 104 may be hosted on a third party cloud-based server, such as Amazon Web Services, Mainframe2, or Microsoft Azure, for example. Users of the web-based yearbook design system 104 may include, for example, yearbook staff and students that have been granted access by way of a subscription or other enrollment by their school. The web-based yearbook design system 104 may include educational tools for use by yearbook staff/students to learn how to design and create a yearbook. The yearbook design system 104 may also include an online web-based system for designing and creating a yearbook. This system may be, for example, an in-house design system of interfaces providing layout templates and tools, artistic affect tools, formatting tools, and the like. The web-based yearbook design system 104 may include any and/or all of the features described in U.S. patent application Ser. No. 13/535,927, entitled System and Method for Yearbook Creation, filed on Jun. 28, 2012, the content of which is hereby incorporated by reference herein, in its entirety. The web-based system may be suitable for schools and other users not wishing to pay for or deal with a more sophisticated system. The system may be accessible, for example, merely by access to the interne and with a browser.

As shown in FIG. 3, the web-based yearbook design system 104 may provide various elements such as a user login 110 and a homepage 118, which may provide access 120 to the design software access portal 104 and to a yearbook page ladder 122. A user may first interact with the web-based yearbook design system 104 at a login page 110, such that users may be authenticated and verified before getting access to the system.

Figure 4:
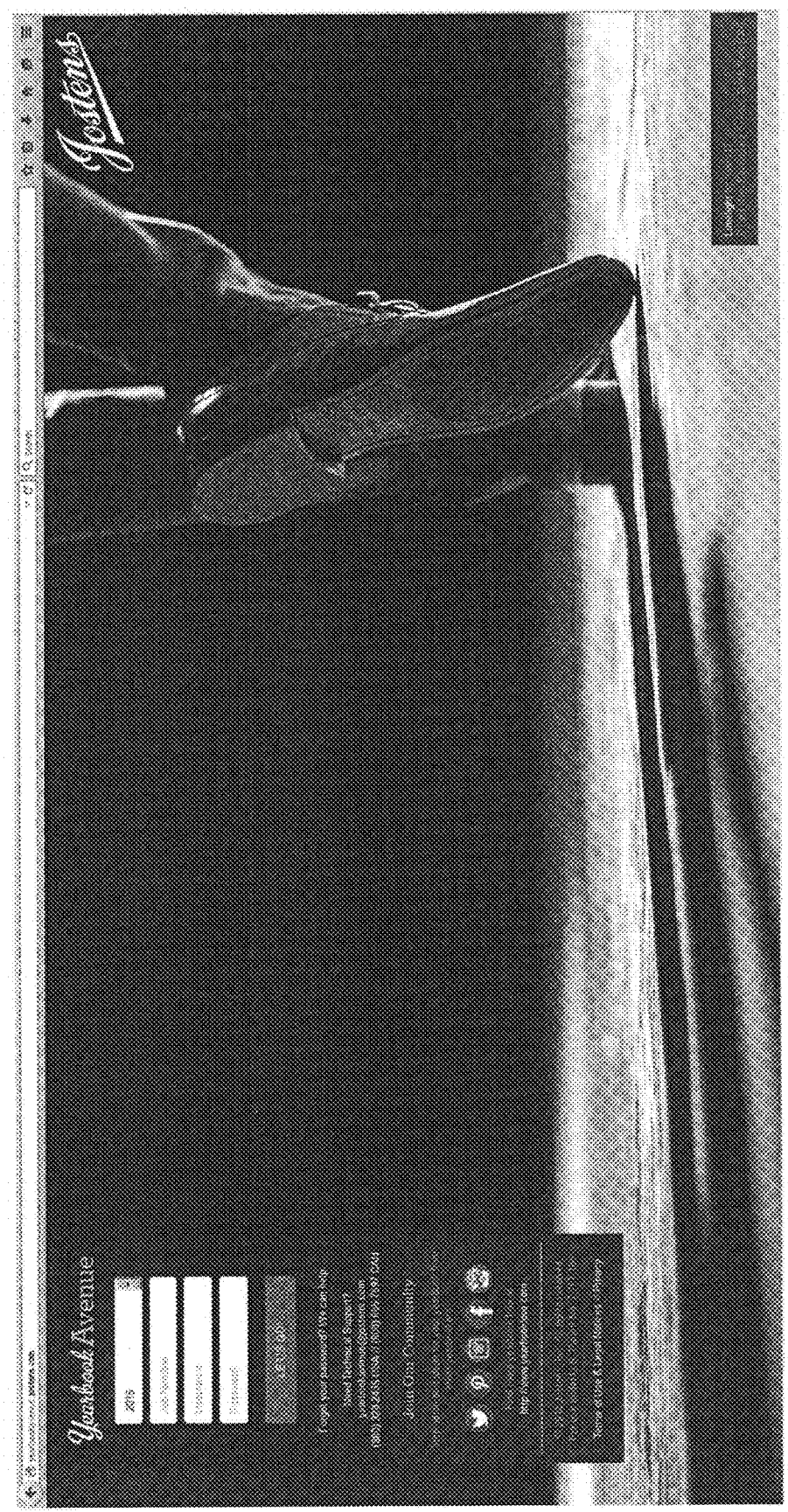
FIG. 4 shows a login screen for a yearbook design system, according to some embodiments.

FIG. 4 shows an example of a login screen 110. A user may be required to input a username, password, and/or other identifying information at the login screen 110. If a user has forgotten a password or other identifying information, the user may be directed to a forgot password page 114, where a user may be asked for other identifying information. After entering identifying information, the web-based design system 104 may send an e-mail 116 to the user with the user's forgotten password and/or instructions to reset a password. After a user has logged in and is authenticated 112, the web-based yearbook design system 104 may proceed to a homepage 118.

Figure 5:
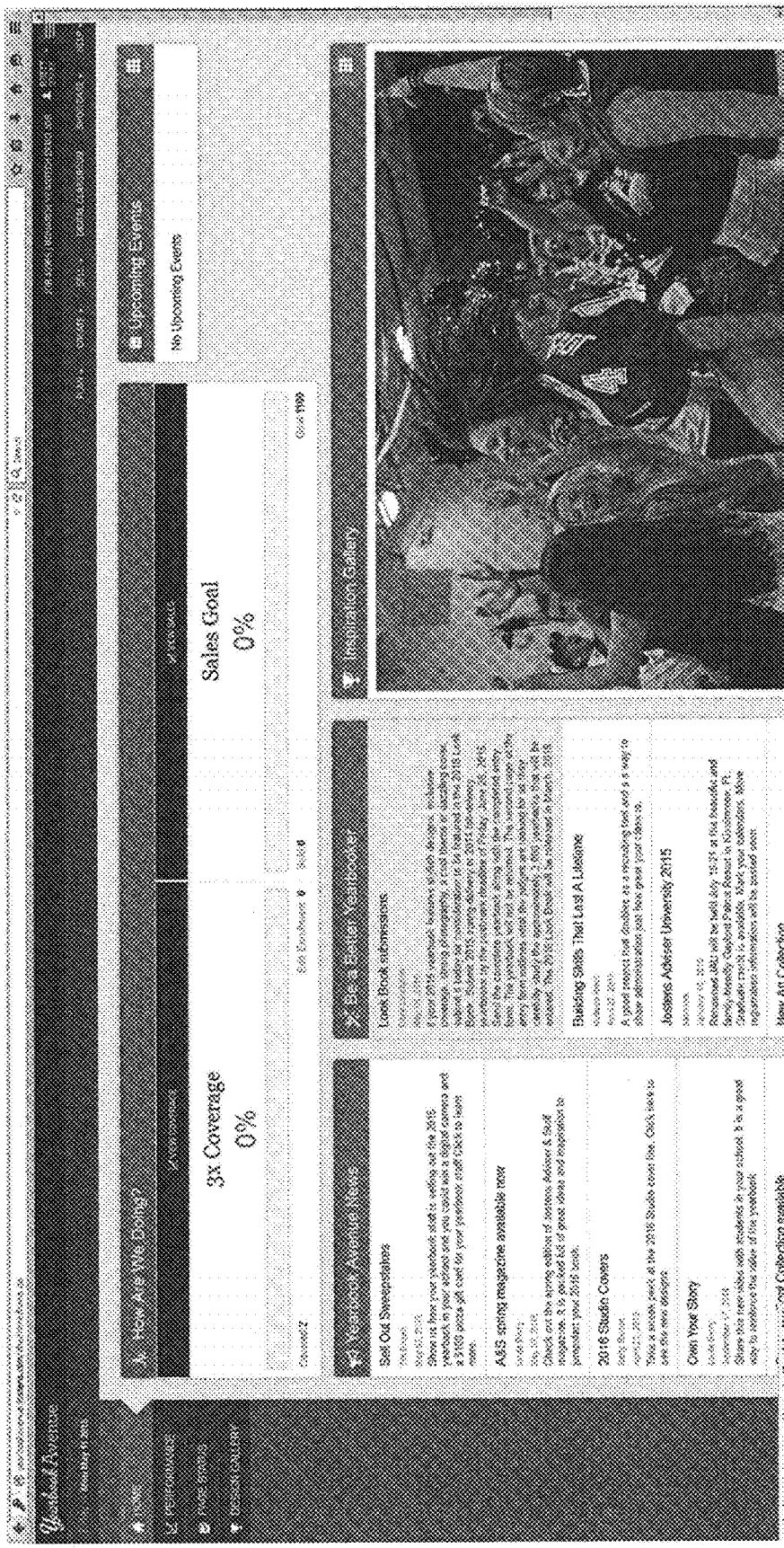
FIG. 5 shows a homepage of a yearbook design system according to some embodiments.

FIG. 5 shows an example of a homepage 118. From the homepage 118, a user may have access to various web-based design tools and other options. From the homepage 118, a user may be able to view a page ladder 122, which may provide an illustration of the progress or completion of individual pages of a yearbook in the design process. In some embodiments, the page ladder 122 may be in communication with a database such as a yearbook page repository 126.

The web-based yearbook design system may also include an option to utilize design software for designing a yearbook. For example, the option may provide for the use of Adobe InDesign, Adobe Photoshop, Quark, Corel, or other third party software. Still further, while referred to as third party software, in some embodiments, the software accessed via the portal may be a product of the company or entity providing the web-based system. As mentioned, access to this software may allow yearbook students to get exposure to current design software that is on the market and which may be used for journalism or other publishing projects now or in their future endeavors.

In some embodiments, a particular school may enroll or sign up for this option. Accordingly, upon logging in to the web-based yearbook design system, a link, click button, or other access tool may be provided and available for execution by a user affiliated with an enrolled school. In other embodiments, the link, click button or other access tool may be available for all users and may function only for those users that are affiliated with an enrolled school. In some embodiments, when a user is not affiliated with an enrolled school, the access tool may be present, but it may be grayed out to show that it is non-functional. Where a user is affiliated with an enrolled school, executing the access tool may provide access to a portal to the third party design software.

Figure 6:
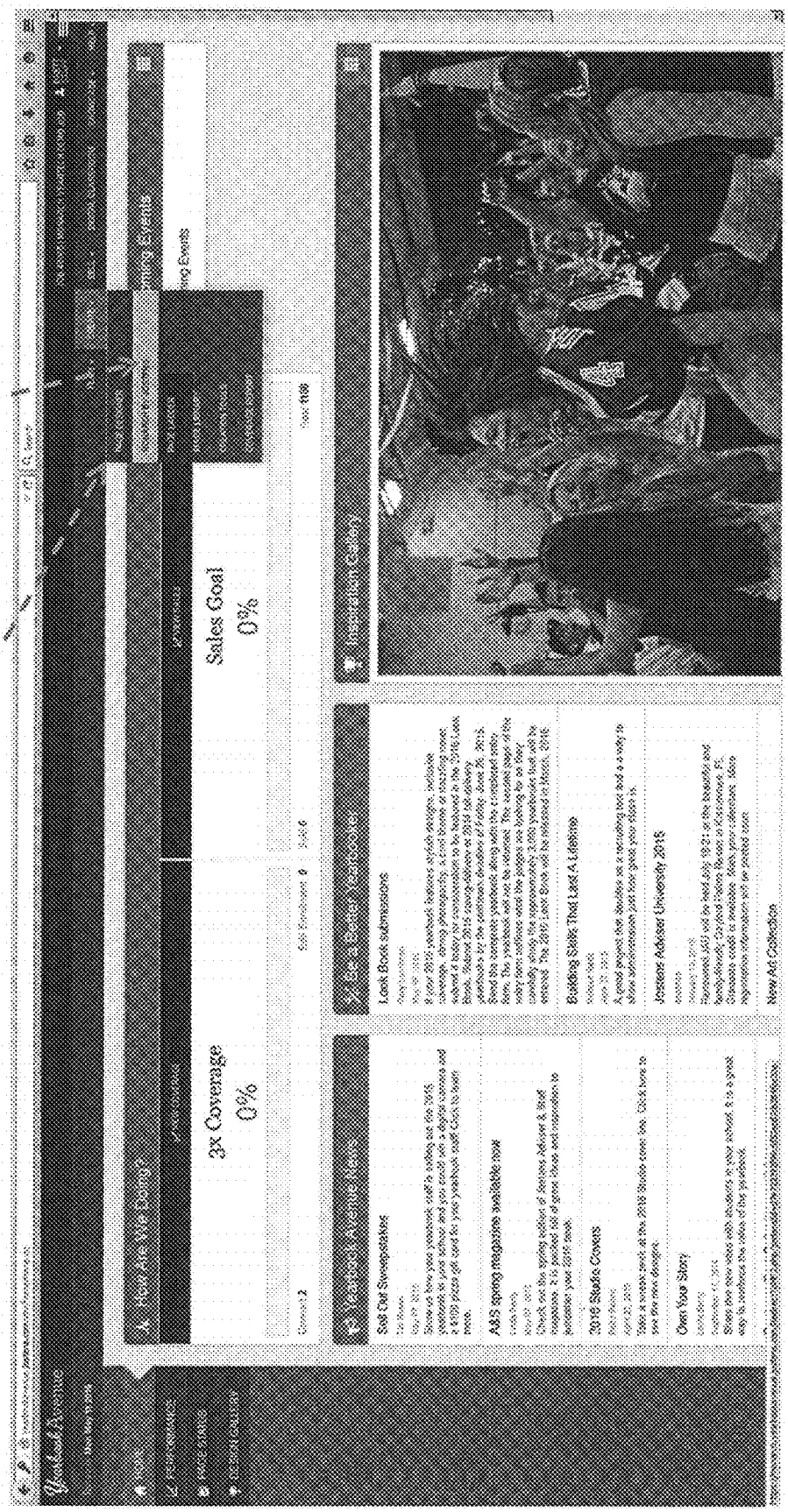
FIG. 6 shows a homepage of a yearbook design system, with a menu option to connect to a different yearbook design system, according to some embodiments.

As shown in FIG. 3, a user may have access to the design software access portal 106 and ultimately the hosted design system 108 from the homepage 118. As mentioned, access to the portal 106 may depend on whether a school is enrolled in the hosted design system 108. As shown in FIG. 3, the web-based system 104 may be connected to a school enrollment database 128, the school enrollment database having a list of which schools or users are enrolled in the hosted design system 108. The web-based system 104 may make a determination 120 of whether the user is affiliated with a school listed in the school enrollment database 128. The determination may be based on the login information provided by the user and a comparison of that information with information of affiliated schools. In other embodiments, if the user identifies a school and successfully logs in the determination may simply be a check of whether the identified school is enrolled. If the user's school is listed as enrolled, the home page 118 may include access to the design software access portal 106. Access to the design software access portal 106 may be in the form of a link, click button, or other means. For example, as shown in FIG. 6, an option to access the portal 106 may appear as an option 131 on a pull down menu 130.

Figure 7:
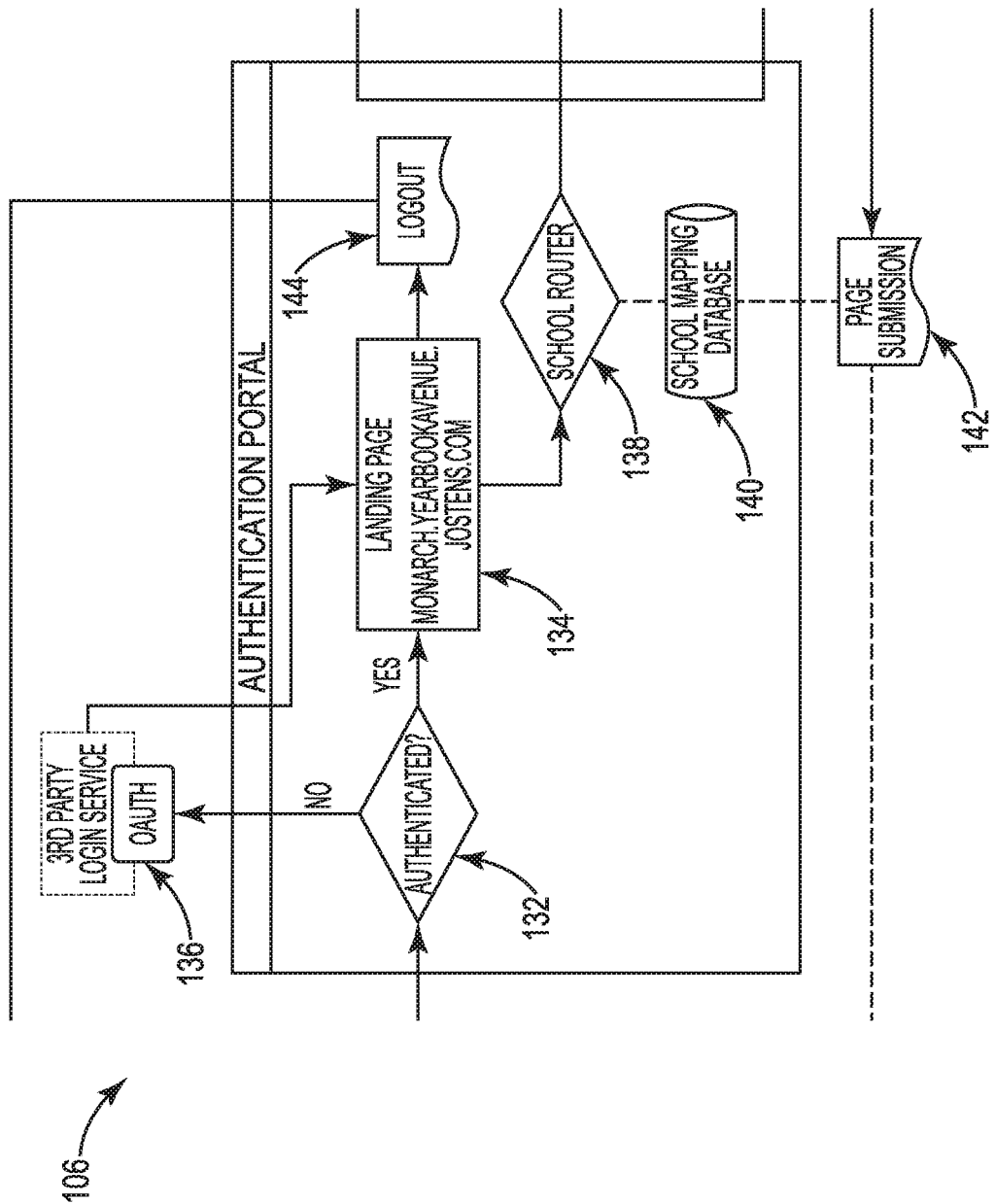
FIG. 7 shows a close-up view of a hosting system access portal, according to some embodiments.

Referring now to FIG. 7, a flow diagram of the portal 106 is shown. The portal 106 may be hosted on an in-house server or it may be provided as a front-end on the cloud-based system 108 shown in FIG. 9. In some embodiments, for example, the portal 106 may be supported by a service such as AWS Elastic Beanstalk. In still other embodiments, it may be hosted on a cloud-based system apart from the cloud-based system 108 of FIG. 9. Still other hosting arrangements may be provided for the portal 106.

Figure 8:
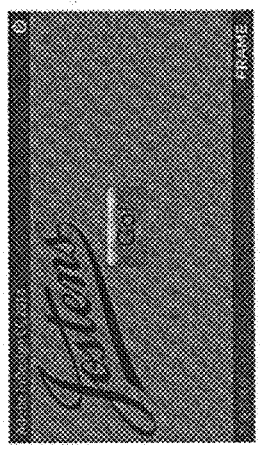
FIG. 8 shows a landing page of a hosting system access portal, according to some embodiments.

The portal 106 may be responsible for authenticating 132 a user with respect to the third party software. For example, the third party software may require login information to monitor, track, and/or control the usage of the software. As such, a portal 106 may capture user information from the login of the web-based system 104 and use that information to automatically authenticate 132 a user's use of the third party software. In another embodiment, a user may be prompted for an additional username and password, for example. Other levels of authentication may be provided including multi-factor authentication such as authentication including something the user is, has, and knows, for example. In either case, such authentication may be performed by the system based on information captured during the web-based login or a separate prompt may be provided. If authentication 132 is successful, the user may be sent to a third party landing page 134. If authentication 132 is not successful, the user may be sent to a different page 136 without gaining access to the portal 106. From the third party landing page 134, a user may have an option to log out 144 of the portal 106, and return to the web-based system 104 according to some embodiments. An example of a third party landing page 134 is shown in FIG. 8.

In addition to authentication 132, the portal 106 may monitor the number of users using the system and may verify a sufficient number of licenses or may restrict use when insufficient software licenses are available. In other embodiments, the portal 106 may simply monitor and track usage such that software license fees may be paid based on the amount of usage. Still other approaches to accounting for software licenses may be provided.

The portal 106 may further function to route a user to a particular space within the cloud-based system 108. In particular, a user may be affiliated with a particular school and the portal 106 may function to grant the user with access to a design space or cell that is dedicated to a particular school's yearbook design and isolated from other schools' yearbook designs. After a user logs into the portal 106, the system may access a school router 138, which may in turn be in communication with a school mapping database 140. The school mapping database 140 may contain information related to each enrolled school's design space or cell. The school router 138 may communicate with the school mapping database 140 to determine which design space or cell to direct a user to.

Figure 9:
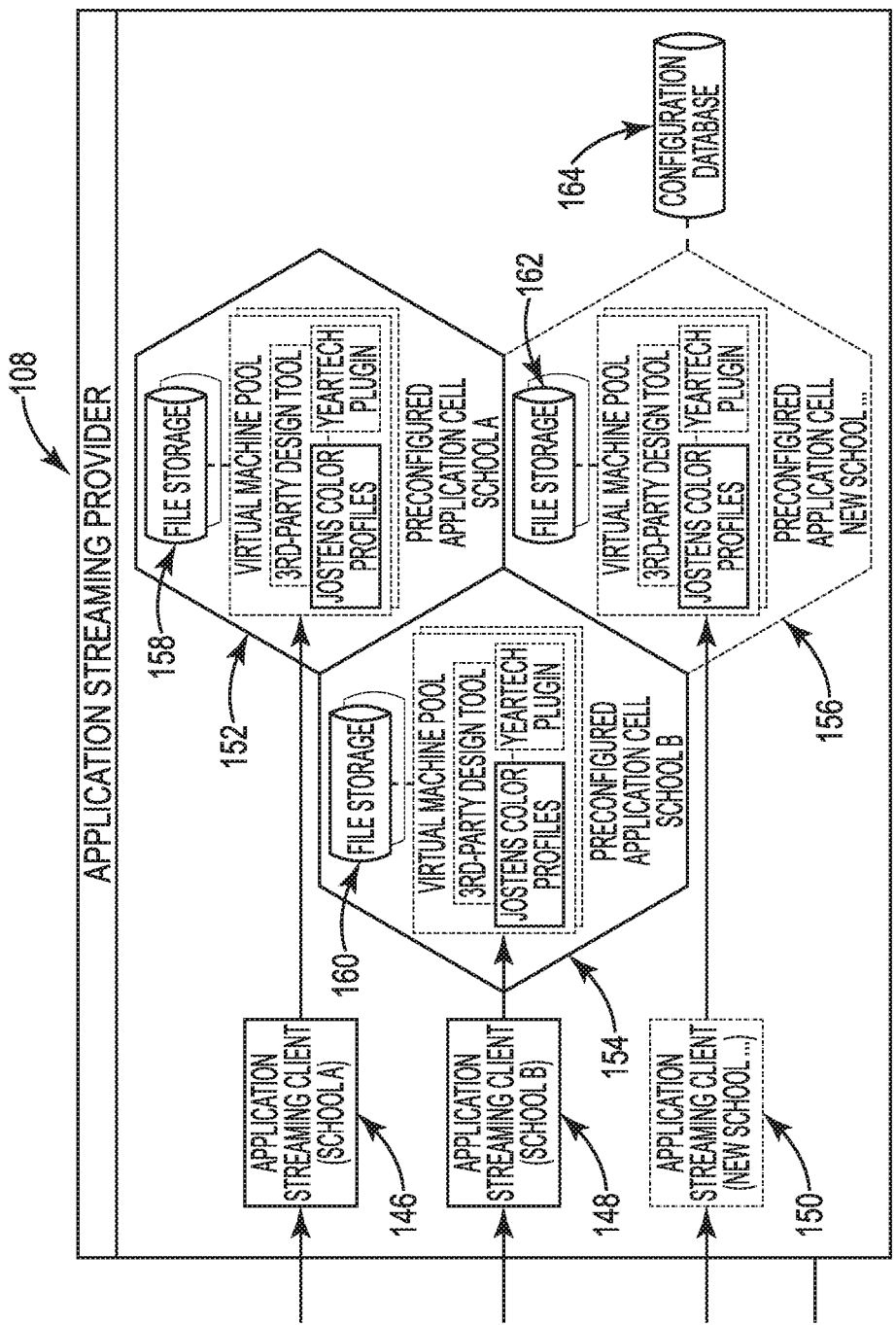
FIG. 9 shows a close-up view of a segregated hosted publishing system, according to some embodiments.

Referring now to FIG. 9, a segregated and cloud-based infrastructure 108 is shown for hosting design software. As shown, the infrastructure may be hosted on a cloud-based server or system such as that provided by Amazon Web Services, Mainframe2, Microsoft Azure, or other cloud-based hardware systems. It should be appreciated that while a third party service is described as options for cloud-based servers, the publishing company, such as the company hosting the web-based system may also provide the cloud-based server. It should be appreciated that the cloud-based system 108 may provide virtual machine technology, and may allow for on-demand usage of both processors and storage. Virtual machine technology may be supported by a server software such as Citrix MetaFrame or other software systems. Storage may include data storage devices owned or maintained by a cloud-based hardware system provider such as those listed above, or by a publishing company for example, such as Jostens. In other embodiments, other storage arrangements may be provided. In some cases, the number of users of the system may affect the amount of processing power that is used and the amount of data being stored may affect the amount of storage space being used. Such facilities may allow the usage of the cloud-based infrastructure to dynamically grow and shrink based on the number of users accessing the system, the processes being performed, and the amount of data being stored from time to time.

In some embodiments, in addition to being on-demand or dynamic, the system 108 may be configured to anticipate times of higher use and, as such, may pre-spawn resources to speed up the connection process. For example, pre-spawning could be selected by users based on user knowledge of higher use times (i.e., during yearbook class times). In other embodiments, the system 108 may monitor usage and track patterns of higher use and adjust pre-spawn accordingly. Such pre-spawn efforts by the system 108 may be configured to focus on particular schools and spawning resources for particular schools. The system 108 may further be configured to manage the utilized resources by balancing the speed of connection vs. the cost of running unused servers or resources.

With continued reference to FIG. 9, each group of users of the cloud-based system 108, such as those affiliated with a particular school, may be provided with access to design software while being isolated from usage and designs of other groups of users. As shown, each group of users 146, 148, 150 may thus have access to a particular design space or cell 152, 154, 156, respectively, on the cloud-based server with access to a particular design software and other tools such as, but not limited to, color profiles or particular plug-ins. Access to other types of software may be provided as well. It is to be appreciated that each group of users may have access to the same or similar software or tools at the same time, but without interaction with other groups' yearbook designs. In some embodiments, this may function by providing an application streaming provision that allows for streaming of a design application to a user, but limiting the access of that user to a particular storage file or files. A group of users may have access to the same storage file or files, but still have individual streaming of a design application, in some embodiments. Additionally, as shown, each design space or cell 152, 154, 156 may provide users of each group 146, 148, 150 with access to a different database or portion of a database 158, 160, 162 storing design files related to the related schools' designs and not to other schools' designs.

Together, a group of design spaces or cells 152, 154, 156 may form a hive. A hive may be made up of one or more individual design spaces or cells. In some embodiments, design spaces or cells may be grouped together in hives based on geographical location, geographical distance to the cloud-based server or other cloud provider, and/or network distance. That is, for example, a hive may be made up design spaces or cells for schools geographically located within a particular area, or within a particular distance from a cloud-based server. In other embodiments, design spaces or cells may be grouped into a hive based on other factors. It should be appreciated that the collective hive may be managed or maintained as a unit. As such, for example, where a design space is part of a particular hive, any cell within that hive may pre-spawn for use by users accessing the design space. In some embodiments, a group of hives may be managed or maintained as a unit.

Within each design space 152, 154, 156, a school may be provided with access to design software such as Adobe InDesign, Adobe Photoshop, Quark, Corel, or other photo and/or publishing tools. In other embodiments, other third-party software may be provided such as but not limited to those provided by Microsoft Corporation, Autodesk, or other software companies or open source software may be used. In some embodiments, the particular design software may be further supplemented with plug-ins that may adapt or augment the third-party software to make is easier to use or more efficient for yearbook design, for example. In some embodiments, for example, color profiles may be provided to allow uniform color selections to be made throughout a given school's yearbook. Similarly, font profiles, book or page design templates, or images such as clip art may be provided to supplement the design software. In this or other embodiments, a yearbook specific plug-in may be provided to augment the third party software with tools that are specific to or otherwise regularly used in designing and laying out a yearbook.

Figure 10:
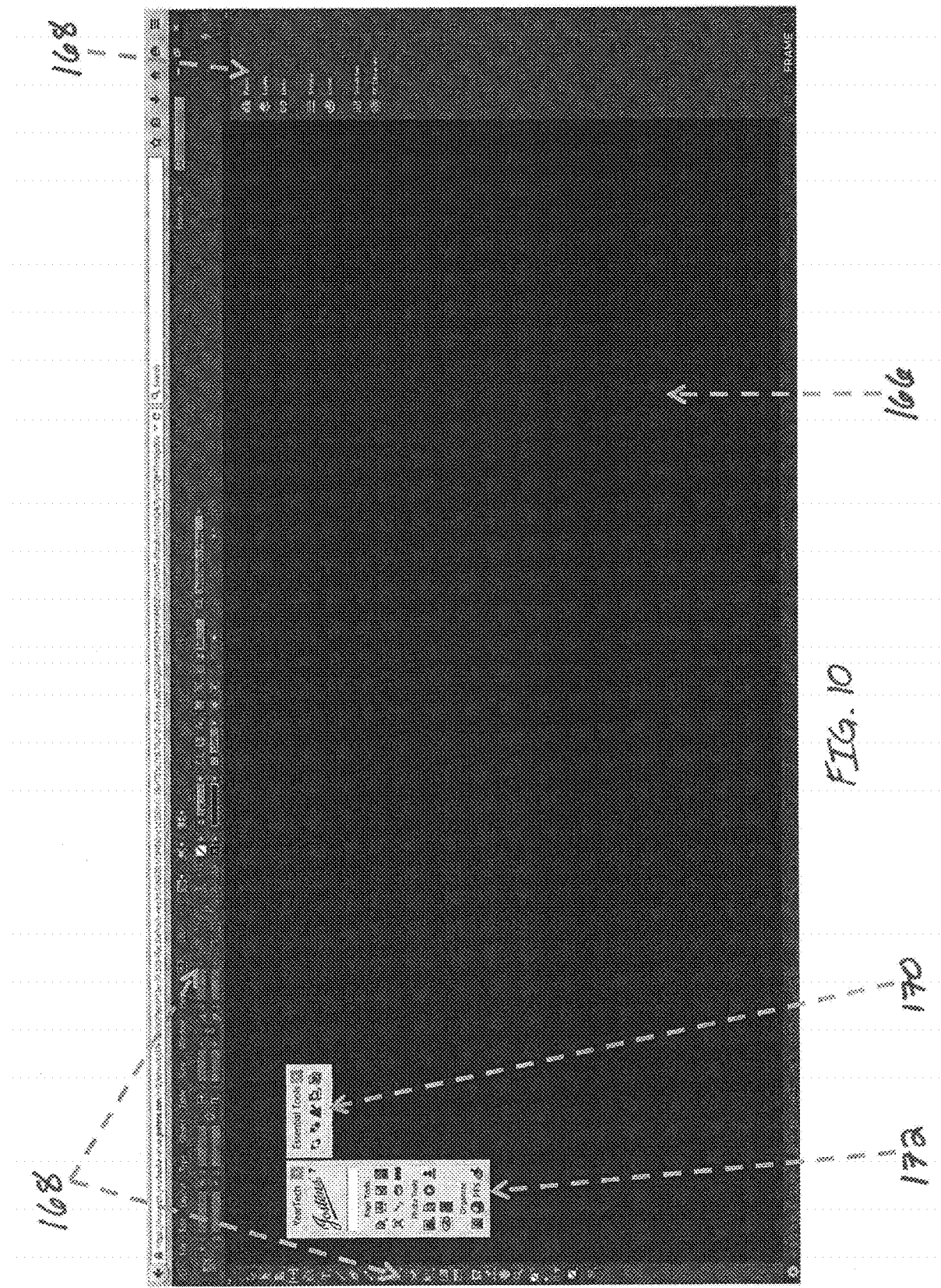
FIG. 10 shows a yearbook design system, according to some embodiments.

In some embodiments, the user experience with the third-party software may be able to be controlled by the yearbook publisher or by the school. That is, each space 152, 154, 156 may be a preconfigured space or cell that may be particularly adapted for use by a particular school. For example, factors such as school size, school colors, cost, or other factors may create incentives for school officials or yearbook staff to put limitations on the yearbook design and/or provide a particular starting point for the yearbook design, or limit the access to particular features of the software. Each predefined configuration may be stored on the cloud such that each space 152, 154, 156 may access the configuration database 164 on an as-needed basis to provide a user with the appropriate preconfigured environment. FIG. 10 shows an example of a design space that a user may see upon accessing the cloud-based system 108.

As shown in FIG. 10, when a user initially accesses the cloud-based system, a design software such as Adobe InDesign may open automatically without requiring additional user action. In addition to the design area 166 and standard toolbars 168 of the software, pre-configured and/or customized toolbars may also be provided within the design software. For example, a Relevant Tools toolbar 170 may provide shortcuts to particular frequently accessed features in the design software. As shown in FIG. 10, for example, where the Relevant Tools toolbar 170 is preloaded in the Adobe InDesign software, the toolbar may provide quick access to features such as "bring to front" or "send to back," which are tools that InDesign already provides. This may allow for more efficient or easier yearbook design. As another example, a Yeartech toolbar 172 may provide templates, layouts, or other plug-ins or tools, which may be specific to yearbook creation. For example, the Yeartech toolbar 172 may include such tools as preconfigured yearbook template layouts, quick photo accessing options, options to apply filters or effects to photos, and name indexing tools. Toolbars such as the Yeartech toolbar 172 may include an option for submitting the yearbook or a portion thereof for proofing, production, and/or printing.

Figure 11:
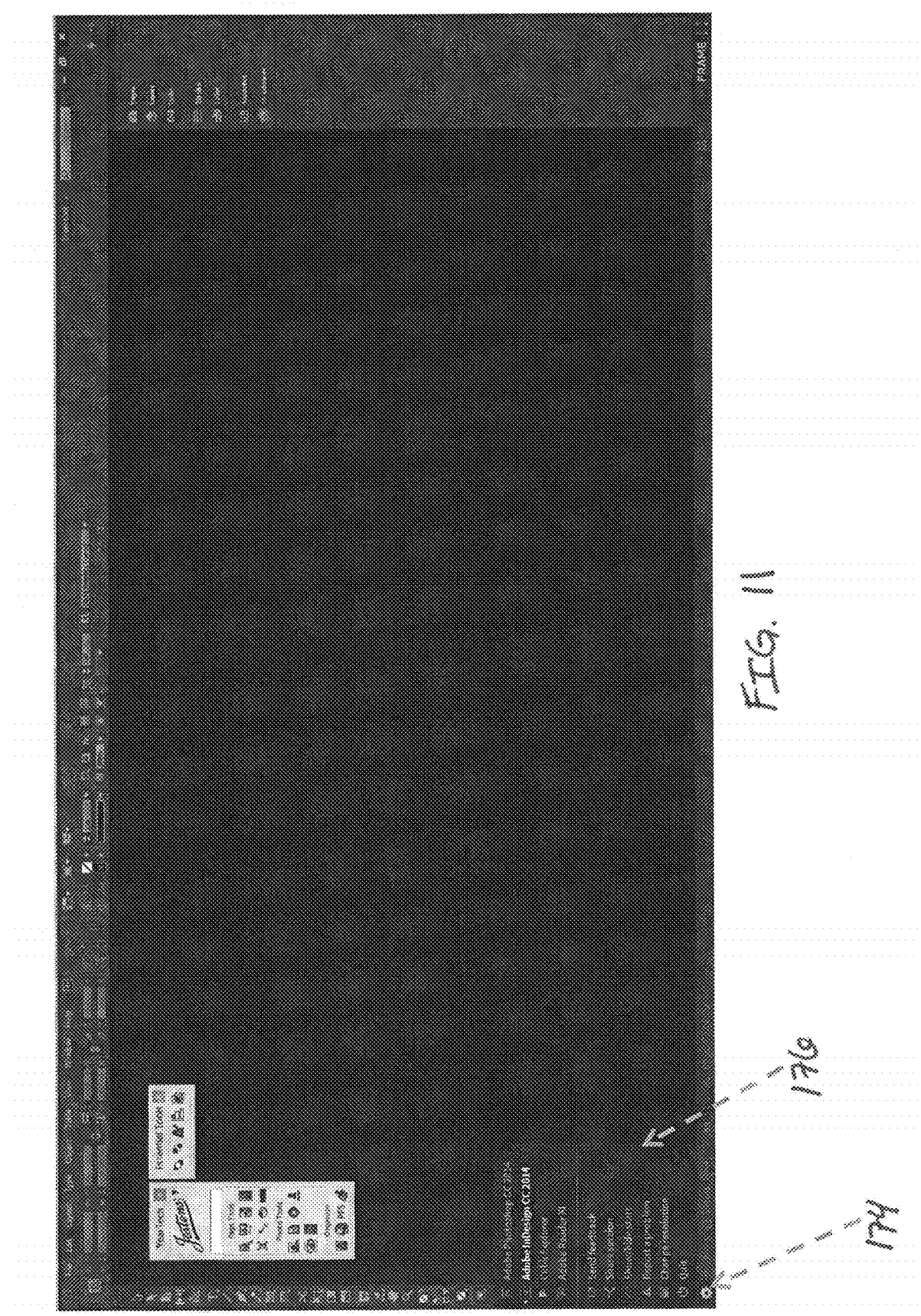
FIG. 11 shows a yearbook design system, with a menu option to open software, according to some embodiments.

While one or more software applications may automatically open when a user accesses the hosted design system 108, there may also be provided an option for switching to or opening other software applications. For example, as shown in FIG. 11, an icon 174 in the web-based view may open a menu 176 with various options. This menu 176 may allow a user to open, switch to, or toggle back and forth between various software, such as Adobe Photoshop, Adobe InDesign, CubicExplorer, Adobe Reader, and/or other software. The menu 176 may additionally include other options such as help options, logout options, options for allowing multiple users to work in the same space, etc.

In some embodiments, while the system 108 may be cloud-based and may be accessed via the internet, the system may be closed-off from other access to the internet. For example, while the system 108 may use virtual machine technology, the full features of a cloud-based computer may be restricted so as to avoid the use of the system as a way to circumvent other internet access limitations a school may put in place. In still other embodiments, while virtual machine technology may be somewhat restricted, access to Dropbox or other internet-based file storage locations may be provided to allow for easy upload of photos and other content that may be useful in designing and developing a yearbook.

Photos and images may generally be uploaded for use from an internet-based or cloud-based file storage system, a local file location, an external device, or another accessible location. An internet-based or cloud-based file storage system may include such systems as Dropbox, Google Drive, Box.net, or the Jostens Replay It photo sharing platform, for example, described in U.S. patent application Ser. No. 13/361,841, entitled System and Method for Yearbook Creation, filed Jan. 30, 2012. Additionally or alternatively, photos may be uploaded from the web-based yearbook design system 104. In some embodiments, photos may be uploaded via an application such as the Jostens Field Kit tablet mobile application. Photos and images may be transferred from a local file storage location to the cloud-based design space 152, 154, 156 in some embodiments. Photos and images may also be transferred, in some embodiments, from an external device such as an external hard drive or a cell phone connected by a wired connection, Bluetooth connection, or other connection. In some embodiments, for example, design software may include a link or clickable button that allows a user to browse locally or externally for photos and images, or paste an image in from a URL, as an example. In other embodiments, other methods may be used to locate and transfer photos and images to the cloud-based system 108 for use in designing a yearbook.

It is to be appreciated that the web-based system 104 shown in FIG. 3 and the cloud-based system 108 shown in FIG. 9 may each be used to design and create a yearbook. In many cases, a school will choose to use one of the systems 104, 108 and not the other. In either case, when the yearbook or a portion thereof is complete, a page submission tool 142, shown in FIG. 7, may be used to capture the yearbook or portion thereof and send it through a process of review and printing. In the case of FIG. 3, this system and process is discussed in detail in U.S. patent application Ser. No. 13/535,927, entitled System and Method for Yearbook Creation, filed on Jun. 28, 2012. In the context of FIG. 9, a yearbook or portion of the yearbook may be output in .pdf form or another format such as the native file format of the design software. For example, .indd files may be output from Adobe InDesign or .qxp files may be output from Quark Express. The output may be communicated from the cloud-based system 108 back to the web-based system 104 of FIG. 3 such that particular aspects of the yearbook may be updated within the web-based system. The page submission tool 142 may determine, based on the school mapping database 140, which school page ladder 122 the output should be sent to. In some embodiments, a page ladder 122 may be updated such that yearbook progress and completion may be monitored via the web-based system 104 without drilling through into the cloud-based system 108. In some embodiments, the communication of the yearbook or portion of the yearbook from the cloud-based system 108 to the web-based system 104 may allow the yearbook or portion thereof to be processed through production by printing, collating or otherwise collecting and organizing, and binding. Particular tracking mechanisms may be implemented for controlling and tracking school generic pages and personal pages, including personalized pages and covers. For example, the systems described in U.S. patent application Ser. No. 13/929,948, entitled System and Method for Creating Customized Products, filed on Jun. 28, 2013, the content of which is hereby incorporated by reference herein, may be used for these purposes.

In some embodiments, once the yearbook or a portion thereof is submitted via the page submission tool 142, the yearbook or a portion thereof may be resubmitted any number of times during a window, such as for example a 24-hour window. In this way, in some embodiments, only the latest submission made will be proofed, processed, and/or printed. Such a window may provide users with the opportunity to resubmit items for proofing, production, and/or printing, without causing confusion or backup with multiple submissions. After the window closes, the submission tool 142 may be temporarily unavailable until the proofing, productions, and/or printing is at least partially completed, after which the submission tool may become available once again for new submissions. While the page submission tool 142 is temporarily unavailable for submissions, it may be shown as a greyed out option, for example, in some embodiments, or may be shown as unavailable in other manners.

Figure 12A:
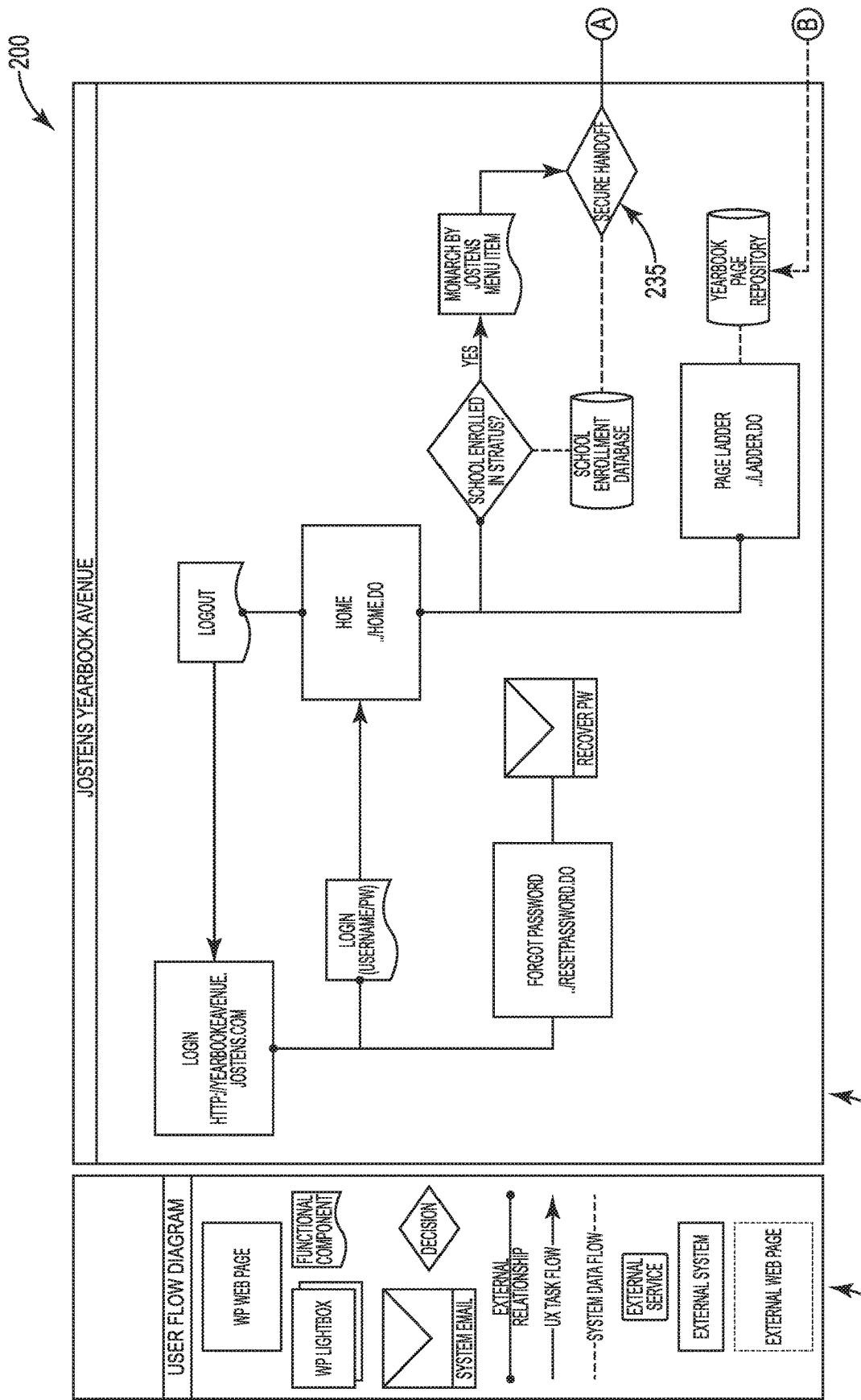
FIG. 12 is a flow diagram showing a yearbook publishing system, according to one or more embodiments.
Figure 12B:
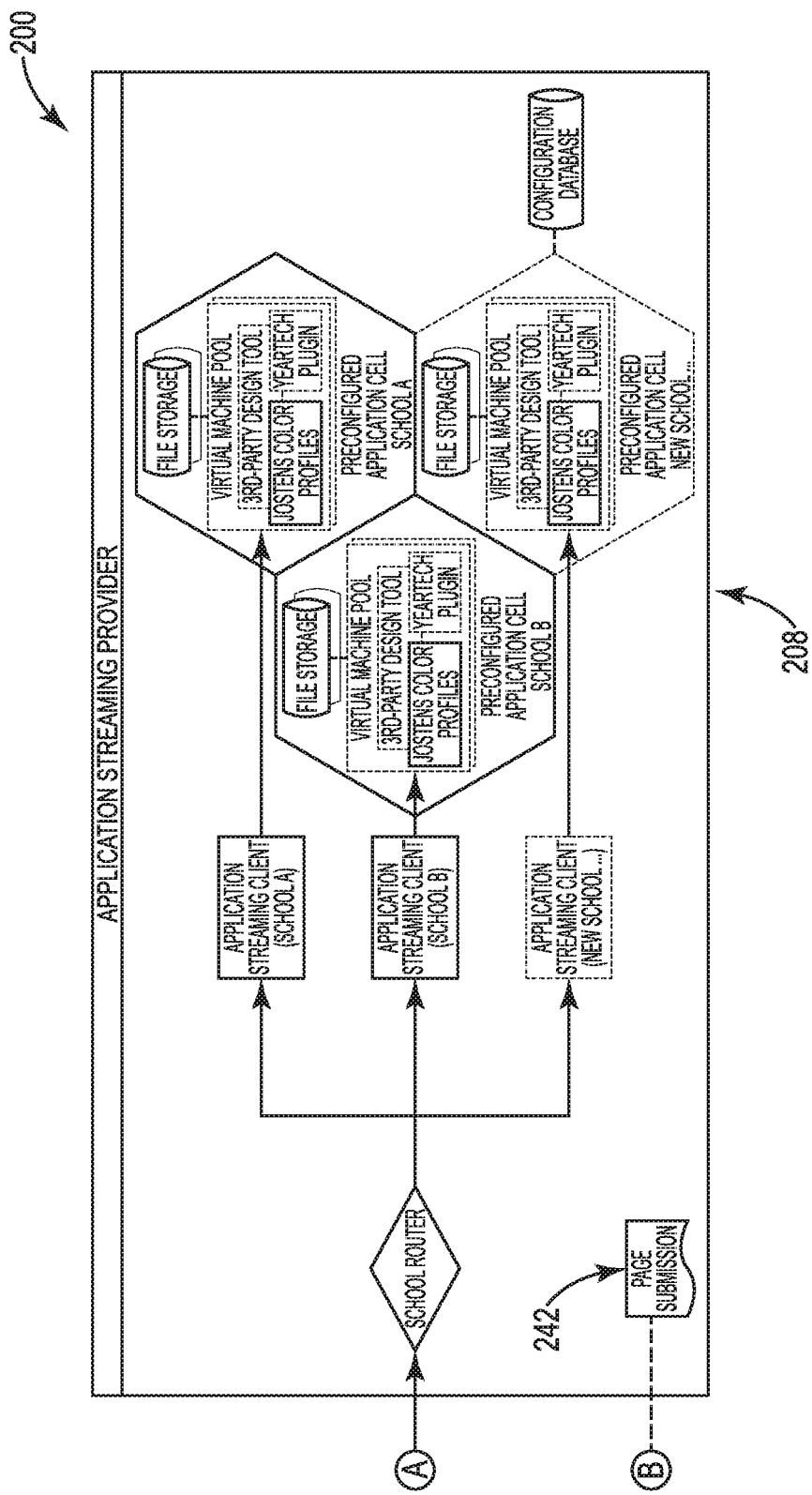

Referring now to FIG. 12, another embodiment of a yearbook design and/or publishing system 200 is shown. In the system 200, a web-based system 204 and hosted design system 208 may be generally similar to the systems 104, 108 described above and may generally have the same features. As with previously discussed embodiments, the system 100 as a whole may allow a user to select between one of two design tools: the web-based yearbook design system 204, and the hosted design system 208. In either case, the design tools may provide for designing and creating a yearbook by multiple schools, while maintaining the designs in isolation from one school to the next. Each of the design tools 204, 208 may also be configured for submitting the finished yearbook to a centralized publication system for printing the yearbook.

As additionally shown in FIG. 12, in some embodiments, the web-based system 204 may communicate directly with the hosted design system 208. In this way, the system 200 may function without the need for a separate portal controlling communication between the web-based system 204 and the hosted design system 208. It is to be appreciated that the web-based design system 204 may perform functions that are described above as being performed by a portal with respect to other embodiments. For example, where the third party or hosted software requires login information to monitor, track, and/or control the usage of the software, the web-based system 204 may capture user login information from an initial login into the web-based system and use that information to automatically authenticate a user's use of the third party software, thereby providing a secure handoff 235 to the hosted design system 208. In another embodiment, a user may be prompted for an additional username and password, or other authentication means may be used for example.

The web-based system 204 may additionally, in some embodiments, monitor the number of users using the system and may verify a sufficient number of licenses or may restrict use to the hosted design system 208 when insufficient software licenses are available. In other embodiments, the web-based system 204 may monitor and track usage of the hosted design system 208 such that software license fees may be paid based on the amount of usage. Other approaches to accounting for software licenses may be provided.

The web-based system 204 may further function to route a user to a particular space within the cloud-based system 208. For example, where a user is affiliated with a particular school, the web-based system 204 may access a school router 238 to determine which design space or cell to direct a user to.

The systems described herein may be configured such that a user may obtain access from any Internet-accessible device. That is, a user may be able to access the web-based system 104, 204, portal 106, and/or cloud-based system 108, 208 from a mobile device such as a smart phone or tablet. A user may also be able to access the systems described herein from a desktop or laptop computer with internet access. In this way, students and yearbook staff may have the ability to design and publish a yearbook without the need to be on campus, connected to a school network, or even together in the same location.

The present solution provides for avoiding updates, licenses, server and network issues that a school may commonly encounter. In addition, this solution allows the school and user to have access to the latest versions with regard to third party and the hosts and/or publisher's software. In addition, the environment where the design software is provided may be controlled meaning the user, despite being "connected" to the internet, may be prevented from using the platform for accessing non-approved applications and technologies providing perhaps a safer/moderated environment.

The ability to segment (e.g., by school) that storage access to a subset of users who are able to share common content, while preventing other segments (e.g., schools) from accessing what is not common to their subset in a cloud environment is something that is very advantageous. This storage/segment/user delineation promotes collaboration to a new level with minimal friction beyond that of cloud storage services such as Dropbox or others. In addition, the grouping of design spaces or cells into hives is advantageous in allowing for management or maintenance of the hive as a unit. For example, this may allow for faster user access and pre-spawning in some embodiments.

The environment that may be pre-configured for the user allows the cloud-based environment to be set up on a very specific level akin to level of personalization allowed when setting up the desktop on a personal computer. In addition, the pre-configuration settings may reset or reload each time a user logs in or logs out of the cloud-based design space. In this way, if a user, such as a student for example, makes changes to the design space or settings, the changes will not have a lasting effect. In this way, each time a user of a particular school or group logs into the design space for that particular school or group, each user is presented with the same preconfigured environment. Of course, schools, groups, and users may have options for permanently altering pre-configurations if desired.

The output feature of the cloud-based system may provide a virtual printer functionality that allows schools to print their files without needing to use Dropbox to download, for example. Regarding the predefined configuration, in some embodiments, color settings, fonts, templates, and other aspects may be pre-installed to assist separate design software such as Adobe InDesign, Adobe Photoshop, Quark, and/or Corel, to be synched so that the color appears the same in both programs. For example, in some embodiments, various fonts may be pre-installed and available for use by users so as to minimize situations where the design software is unable to display a font that a user may have pulled from a home computer, for example. Still further, the color settings may be calibrated to the publication component of the web-based system and the resulting printing presses. This may allow for a "What you see is what you get" ("WYSIWYG") environment where the resulting yearbook has colors that match very closely if not identically with what appears in the design software. The predefined configuration may allow for setting up the layout tool to match needs of production. Plugins to the design software may be pre-installed and configured to make it easy for the users to create their yearbooks and submit them to the publishing company. In some embodiments, preference files and favorites may be provided to make navigating the site as user friendly as possible. For example, when a particular design software program is launched, it may immediately navigate to a digital photos folder where the school has uploaded their photos rather than leaving them to browse around trying to find them. In such embodiments, users may still have the ability to browse for photos or other documents located in local or remote storage, for example. Another plug-in or other preconfigured setting may provide for direct access to cloud-based or otherwise Internet-based photo albums such as Replay It, Dropbox, Google Drive, Box.net, or others, allowing a user to place such photos into the yearbook design without needing to download a copy onto the local hard drive. Other plug-ins or tools may allow users to place non-printing notes on the yearbook design in the various design software environments or allow creation of charts, graphs, or other graphics. Another plug-in or tool may provide for creation of indexes or databases such as a names index which helps to ensure correct spelling of names throughout the yearbook design. Creation of the index or database may be performed automatically and may be a background process in some embodiments. In other embodiments, creation of such an index or database may require user prompting.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, thin client device, streaming device such as Amazon Fire or Chromecast, game console such as Playstation, Xbox, or Wii, open platform such as Raspberry Pi, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, solid state drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial, shareware, or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A yearbook publishing system, comprising:
   one or more processors, the one or more processors configured to execute a web-based system, wherein the web-based system is hosted on a local server accessible by a user via the internet, the web-based system comprising:
      a plurality of design tools for designing a yearbook; and
      an alternative design software access feature for accessing design software for designing layout of and editing content for a yearbook; and
   an on-demand cloud server in communication with the local server and hosting a cloud-based system and the design software, the cloud-based system being accessible via the web-based system and configured to provide dynamically provisioned and segregated user access to a selected design space based on affiliation with a particular group, wherein the selected design space includes a virtual machine executing the design software, wherein the executing design software is accessible to the web-based system via the alternative design software access feature and the selected design space, and wherein the executing design software is adapted by at least one plug-in providing one or more yearbook design supplements from the group consisting of: color profiles, font profiles, book or page design templates, clip art, and combinations thereof.

2. The yearbook publishing system of claim 1, wherein the cloud-based system comprises an output feature for outputting a portion of a yearbook design.

3. The yearbook publishing system of claim 2, wherein the web-based system further comprises a publication component for receiving the portion of the yearbook design.

4. The yearbook publishing system of claim 3, wherein the publication component is configured for printing and binding the portion of the yearbook.

5. The yearbook publishing system of claim 2, wherein the web-based system further comprises a ladder feature for depicting thumbnail images of yearbook pages to depict completion status.

6. The yearbook publishing system of claim 5, wherein the output feature is in communication with the ladder feature to maintain an up-to-date completion status.

7. The yearbook publishing system of claim 1, further comprising a portal accessible using the alternative design software access feature, the portal providing access from the web-based system to the cloud-based system, the portal comprising:
   an authentication feature; and
   a navigation feature for navigating a user to a selected design space based on affiliation with a particular group.

8. A method for providing yearbook design software, comprising:
   providing a web-based system hosted on a local server and accessible by a user via the internet, the web-based system comprising:
      a plurality of design tools for designing a yearbook; and
      an alternative design software access feature for accessing design software for designing layout of and editing content for a yearbook; and
   providing dynamically provisioned and segregated user access to a selected design space based on affiliation with a particular group, wherein the selected design space includes a virtual machine executing the design software, wherein the executing design software is provided via a cloud-based system hosted on an on-demand cloud server in communication with the local server and hosted design software, the cloud-based system being accessible to the web-based system via the alternative design software access feature and the selected design space, the executing design software being adapted by at least one plug-in providing one or more yearbook design supplements from the group consisting of: color profiles, font profiles, book or page design templates, clip art, and combinations thereof.

9. The method of claim 8, wherein the cloud-based system comprises an output feature for outputting a portion of a yearbook design.

10. The method of claim 9, wherein the web-based system further comprises a publication component for receiving the portion of the yearbook design.

11. The method of claim 10, wherein the publication component is configured for printing and binding the portion of the yearbook.

12. The method of claim 9, wherein the web-based system further comprises a ladder feature for depicting thumbnail images of yearbook pages to depict completion status.

13. The method of claim 8, further comprising providing an authentication portal accessible using the alternative design software access feature, the portal providing access from the web-based system to the cloud-based system, the portal comprising:
- an authentication feature; and
- a navigation feature for navigating a user to a selected design space based on affiliation with a particular group.

14. The method of claim 8, wherein the cloud-based system is configured to pre-spawn based on usage.

15. A method for providing yearbook design software, comprising:
- providing access to an on-demand cloud server configured to host design software for designing layout of and editing content for a yearbook, wherein access is provided based on a group affiliation with one of a plurality of groups;
- for each of the plurality of groups, providing a unique design space on the cloud server; and
- providing the design software to a virtual machine executing within each design space, wherein access to the design software is provided via an alternative design software access feature, and wherein the design software is adapted by at least one plug-in providing one or more yearbook design supplements from the group consisting of: color profiles, font profiles, book or page design templates, clip art, and combinations thereof.

16. The method of claim 15, wherein each design space comprises one or more design tools.

17. The method of claim 16, wherein each design space comprises a pre-configuration of software and design tools, and wherein each pre-configuration is stored in a configuration database.

18. The method of claim 17, wherein each group comprises a school, and each pre-configuration is determined by each school.

19. The method of claim 15, further comprising providing an output feature for outputting a portion of a yearbook design.

20. The method of claim 15, wherein the virtual machine executing within each design space provides limited access to the design software.

* * * * *